United States Patent [19]

Nisperos-Carriedo et al.

[11] Patent Number: 5,376,391
[45] Date of Patent: * Dec. 27, 1994

[54] METHOD OF INCREASING THE STABILITY OF FRUITS, VEGETABLES OR FUNGI AND COMPOSITION THEREOF

[75] Inventors: Myrna O. Nisperos-Carriedo; Elizabeth A. Baldwin, both of Winter Haven, Fla.

[73] Assignee: The United States of America as represented by the Secretary of the Agriculture, Washington, D.C.

[*] Notice: The portion of the term of this patent subsequent to Mar. 30, 2010 has been disclaimed.

[21] Appl. No.: 37,043

[22] Filed: Mar. 25, 1993

Related U.S. Application Data

[63] Continuation-in-part of Ser. No. 679,849, Apr. 3, 1991, Pat. No. 5,198,254.

[51] Int. Cl.$^5$ .............................................. A23B 7/16
[52] U.S. Cl. ...................................... 426/102; 426/61; 426/302; 426/308; 426/310; 426/326; 426/616; 426/637; 426/654; 426/615
[58] Field of Search ................. 426/61, 102, 302, 308, 426/310, 326, 616, 637, 654, 615

[56] References Cited

U.S. PATENT DOCUMENTS

| | | | |
|---|---|---|---|
| 2,470,281 | 5/1949 | Allingham | 426/310 |
| 3,410,696 | 11/1968 | Rosenfield . | |
| 3,451,826 | 6/1969 | Mulder . | |
| 3,533,810 | 10/1970 | Shillington et al. | 426/267 |
| 3,669,691 | 6/1972 | DeLong et al. . | |
| 4,284,651 | 8/1981 | Bruemmer | 426/50 |
| 4,288,460 | 9/1981 | Ciliberto et al. | 426/96 |
| 4,649,057 | 3/1987 | Thomson | 426/532 |
| 4,883,673 | 11/1989 | Gonzalez | 426/61 |
| 4,921,715 | 5/1990 | Nordby et al. | 426/102 |
| 4,957,757 | 9/1990 | Law et al. | 426/102 |
| 5,198,254 | 3/1993 | Nisperos-Carriedo et al. | 426/102 |

OTHER PUBLICATIONS

Nisperos-Carriedo, M. O., et al., "Development of an Edible Coating for Extending Postharvest Life of Selected Fruits and Vegetables", Proc. Fla. State Hort. Soc. 104:122–125. 1991.

Nisperos-Carriedo, M. O., et al, "Edible Coating for Fresh Fruits and Vegetables", 1990 Subtropical Technology Conference, Oct. 18, 1990, USDA-ARS-SAA, U.S. Citrus and Subtropical Products Laboratory.

Drake, S. R., et al, "Postharvest Use of Sucrose Polyesters for Extending the Shelf-Life of Stored 'Golden Delicious' Apples", J. Food Sci. 52(3): 685–690. 1987 Institute of Food Technologists.

Dhalla, R., et al., "Effects of permeable coatings on the storage life of fruits." II Pro–long treatment of mangoes (Mangifera indica L., ev. Julie) International Journal of Food Science and Technology (1988) 23, 107–112.

Meheriuk, M., et al, "Effect of Two Polymeric Coatings on Fruit Quality of 'Bartlett' and 'd'Anjou' Pears", J. Amer. Soc. Hort. Sci. 113(2):222–226. 1988.

(List continued on next page.)

Primary Examiner—Helen Pratt
Attorney, Agent, or Firm—M. Howard Silverstein; John D. Fado; Gail E. Poulos

[57] ABSTRACT

Increased stability of fruits, vegetables or fungi is achieved by coating with compositions comprising at least one polysaccharide polymer, a preservative and an acidulant. The compositions may also include at least one emulsifier, at least one plasticizer, at least one resin or rosin, at least one protein, at least one firming or sequestering agent, at least one antioxidant and at least one composition which is a plant growth regulator and/or a chilling injury protectant. Methods of making and using the aforementioned compositions, and fruits or vegetables or fungi coated with the compositions on the exterior surface are also disclosed. Fruits, vegetables or fungi, with or without a rind or peel or skin, or which have been cut or sliced can be coated with the disclosed compositions.

25 Claims, 5 Drawing Sheets

EFFECT OF COATINGS ON FLAVOR COMPONENTS OF LEMONS AFTER 11 DAYS AT 70°F

OTHER PUBLICATIONS

Smith, S. M., et al., "The potential of a sucrose ester coating material for improving the storage and shelf-life qualities of Cox's Orange Pippin apples" Ann. appl. Biol. (1984). 104. 383–391. Printed in Great Britain.

Curtis, G. J., "Some Experiments with Edible Coatings on the Long-Term Storage of Citrus Fruits", Proceedings of the Sixth International Citrus Congress, Tel Aviv, Israel, Mar. 6–11, 1988, R. Goren and K. Mendel (Eds). 1988 Balaban Publishers, Margraf Scientific Books. 1515–1519.

Smith, Steve, et al, "Production of Modified Atmospheres on Deciduous Fruits by the Use of Films and Coatings" HortScience. vol. 22(5) 772–776. Oct. 1987.

"Fruit and Vegetable Coatings" (Author and publication unknown) pp. 66–78.

Nisperos-Carriedo, Myrna O., New and Improved Products, Quarterly Report of Selected Research Projects, Apr. 1 to Jun. 30, 1990, p. 1 USDA-ARS.

Banks, N. H., "Some Effects of TAL Pro–long Coatings on Ripening Bananas", Journal of Exp. Botany, vol. 35, No. 150, pp. 127–137, Jan. 1984.

Dziezak, J. D., "Emulsifiers: The Interfacial Key to Emulsion Stability", Food Tech., Oct. 1988, pp. 172–186.

Banks, Nigel H., "Internal Atmosphere Modification Pro–Long Coated Apples" Acta Horticulturae 157, 1984, 105–112.

METHOD OF INCREASING THE STABILITY OF FRUITS, VEGETABLES OR FUNGI AND COMPOSITION THEREOF

This application is a continuation-in-part of application Ser. No. 07/679,849 filed Apr. 3, 1991 now U.S. Pat. No. 5,198,254, which is herein incorporated by reference.

FIELD OF THE INVENTION

The present invention is drawn to various aspects of edible compositions such as methods of use, articles produced thereby, and methods of making the composition for use in coating a fruit, vegetable or fungus so as to increase the stability of the fruit, vegetable or fungus, for example, during shipping, storage, and retail display, and therefore extend the shelf-life while maintaining quality.

BACKGROUND

Some of the edible coating formulations mentioned in the literature include the following: a) lecithin-methyl-anthranilate-acid emulsion (W. L. Shillington and J. J. Liggett, U.S. Pat. No. 3,533,810, Oct. 13, 1970); b) hydrolyzed lecithin (T. J. Mulder, U.S. Pat. No. 3,451,826, Jun. 24, 1969); c) acrylate and methacrylate polymers (C. F. de Long and T. H. Shepherd, U.S. Pat. No. 3,669,691, Jun. 13, 1972); d) polymers of vinyl acetate (D. Rosenfield, U.S. Pat. No. 3,410,696, Nov. 12, 1968); e) preservative coating consisting of shortening, stearic acid, anionic emulsifier and methylparaben (T. R. Thomson, U.S. Pat. No. 4,649,057, Mar. 10, 1987); f) TAL Prolong, an aqueous dispersion of sucrose esters of fatty acids and the sodium salt of carboxymethylcellulose (J. Exper. Bot 35(10):127–137); and g) Semperfresh, a sucrose-fatty acid polyester and the sodium salt of carboxymethylcellulose (J. Food Sci. 52(3):685–690). Some of these coatings were applied on fresh fruits and vegetables and were reported to be effective in preventing deteriorative changes and prolonging postharvest life. However, these coatings suffer from the disadvantages of having only limited applicability and high cost.

SUMMARY OF THE INVENTION

It is a principle object of the instant invention to provide novel compositions for use in coating a fruit, vegetable or fungus, a method of using said compositions, a fruit, vegetable or fungus having such compositions thereon, and a method of making said compositions; which are novel, highly advantageous, and avoid the aforementioned disadvantages of the prior art.

Another object is to employ the aforementioned various aspects of the present invention to slow the decrease of fruit, vegetable or fungus quality such as loss of freshness, loss of flavor volatiles, spoilage, abnormal ripening, oxidation, growth of pathogens or microorganisms, discoloration, and desiccation during shipment and/or storage and/or display at about room temperature, i.e. about 70° F., and below room temperature, and thereby increase the shelf life of the fruit, vegetable or fungus without adversely affecting the quality thereof.

It is another object to provide coating compositions which may be tailored to specific fruits, vegetables and fungi, and thereby have broader applicability than the compositions of the prior art.

Another object of the instant invention is to provide coatings which are at least a partial barrier to water vapor, and consequently reduce weight loss which would occur with such loss of water vapor from the fruit or vegetable or fungus.

It is another object of the invention to provide such coatings inexpensively, so that they may be widely used and not appreciably increase the cost of the coated fruit, vegetable or fungus.

Another object of the instant invention is to provide coatings, which provide a barrier to moisture loss and gas exchange and, which increase retention and/or induce increased production of, important flavor volatiles in the fruit, vegetable or fungus.

It is another object of the instant invention, to employ the aforementioned various aspects of the invention to maintain the quality of fruits, vegetables and fungi at a fraction of the cost of controlled atmosphere/temperature storage.

Yet another object, is to provide compositions which produce coatings which are appealing and attractive in that they are non-greasy and non-sticky, and add a sheen and gloss to the product when dry.

These and other objects of the instant invention are achieved, either singly or additively, utilizing:

- an edible composition for use in coating a fruit, vegetable or fungus, comprising, at least one polysaccharide polymer, a preservative, an acidulant, lecithin, which is a first emulsifier and a second emulsifier i.e. an emulsifier which is not lecithin and optionally other ingredients, such as, at least one antioxidant composition, at least one composition which is a plant growth regulator, a chilling injury protectant, and a resin or rosin;
- edible compositions for use in coating a fruit, vegetable, or fungus, comprising at least one polysaccharide polymer, preservative, and acidulant, and optionally other ingredients such as at least one emulsifier, at least one plasticizer, at least one antioxidant composition, at least one plant growth regulator, at least one resin or rosin, and a chilling injury protectant,
- edible compositions for use in coating a fruit, vegetable, or fungus, comprising, at least one polysaccharide polymer, a preservative, an acidulant, a plasticizer, a firming or sequestering agent, and a protein and optionally other ingredients such as at least one antioxidant composition, at least one plant growth regulator, a resin or rosin, and a chilling injury protectant;
- a method for increasing stability of a fruit, vegetable or fungus comprising applying the aforementioned edible compositions to an exterior surface of a fruit, vegetable or fungus so as to form a protective edible coating;
- a fruit, vegetable or fungus having on an exterior surface thereof the aforementioned compositions; and
- a method of making said compositions comprising; (1) a first step including mixing the acidulant and the preservative with water to form a first solution; (2) a second step (subsequent to the first step) including mixing the at least one polysaccharide polymer with the first solution to form a second solution; (3) a third step (subsequent to the second step) including mixing a first emulsifier (i.e. lecithin) with the second solution to form a first mixture; and (4) a fourth step, subsequent to the third step, optionally including mixing the first mixture with a second emulsifier and optionally other ingredients, with a homogenizer to form a homogeneous mixture.

Other objects and advantages of the instant invention will become readily apparent from the ensuing description.

BRIEF DESCRIPTION OF THE DRAWINGS

The file of patent contains at least one drawing executed in color. Copies of patent with color drawings(s) will be provided by the Patent and Trademark Office upon request and payment of the necessary fee.

DETAILED DESCRIPTION OF THE PREFERRED EMBODIMENTS

Figure 1:
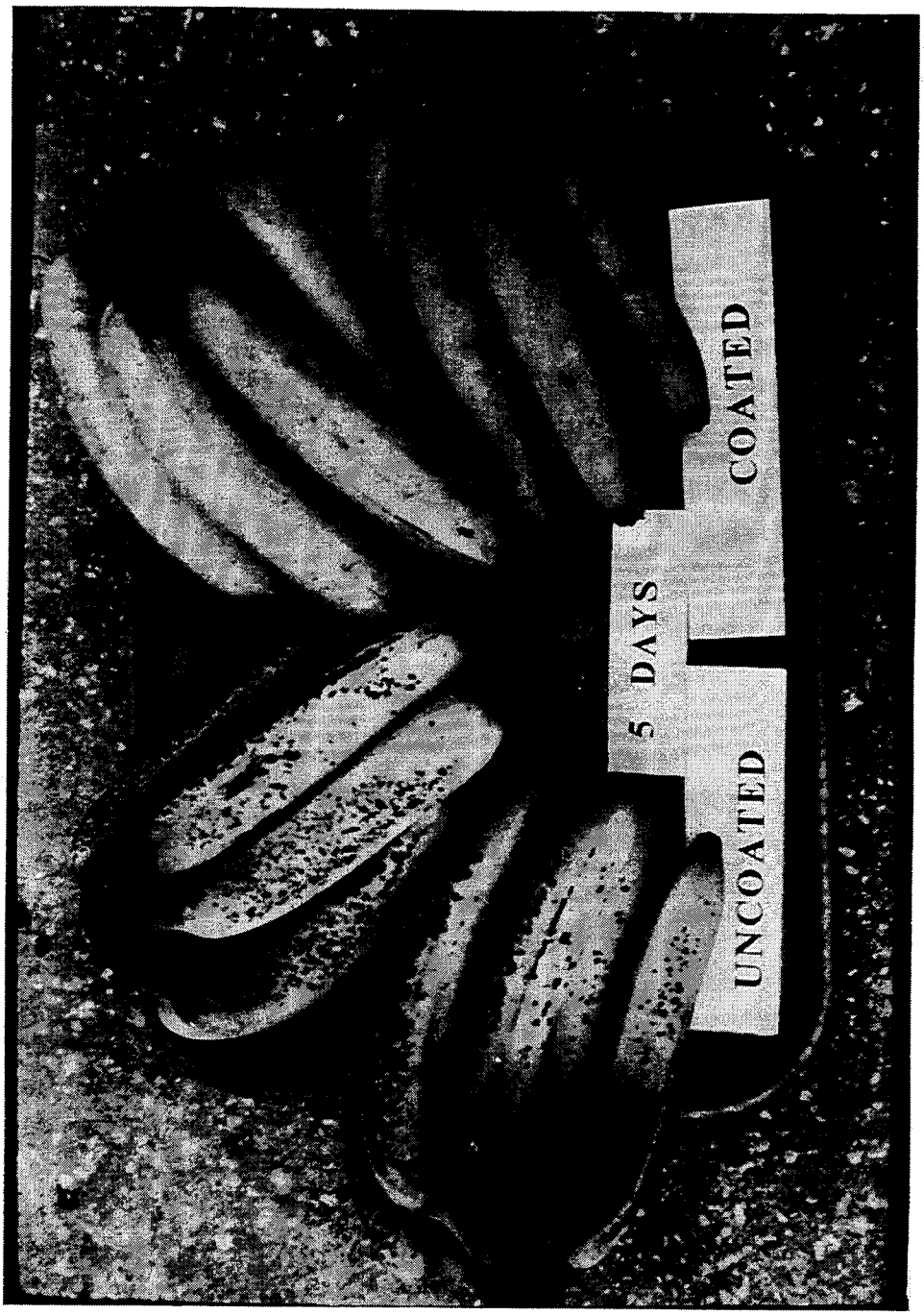
FIG. 1 is a photograph of coated and uncoated bananas, described in Example 1.

The edible compositions for use in coating a fruit, vegetable or fungus, of the present invention may comprise:

(a) at least one polysaccharide polymer, which may for example be at least one polysaccharide polymer selected from the group consisting of carboxymethylcellulose (CMC), hydroxypropyl cellulose (HPC), hydroxypropyl methylcellulose (HPMC), methyl cellulose (MC), guar gum, locust bean gum, pectin, xanthan gum, modified starch and carrageenan.

(b) at least one preservative, such as at least one member selected from the group consisting of sodium propionate, calcium propionate, benzoic acid, sodium benzoate, potassium sorbate, sodium bisulfite, and at least one microorganism which is an antagonist against plant pathogens or antimicrobial essential plant oil. Examples of the aforementioned at least one antagonistic microorganism include: (1) yeasts, such as *Candida guilliermondii* (sexual state is *Pichia guilliermondii*) which controls green mold of citrus caused by *Penicillium digitatum;* (2) fungi, such as Trichoderma especially *Trichoderma pseudokoningii* which controls grey mold disease of strawberry caused by *Botrytis cinerea;* and/or (3) bacterium, such as *Bacillus subtilis* which controls brown rot of stone fruit caused by *Monilinia fructiena.* The antimicrobial essential plant oil may for example be: essential oils from leaves of *Melanleuca leucadendron, Ocimum canum* and *Citrus medica;*

(c) at least one acidulant, which may for example be at least one member selected from the group consisting of malic acid, citric acid, propionic acid, succinic acid, tartaric acid, fumaric acid and ascorbic acid;

As needed, the compositions may also include:

(1) at least one emulsifier, which may, for example, be at least one member selected from the group consisting of polyethylene glycol (PEG), polyoxyethylene sorbitan monooleate (i.e. Polysorbate 80 or TWEEN80 TM) polyoxyethylene sorbitan monostearate, polyoxyethylene sorbitan tristearate, polyoxyethylene sorbitan monolaurate and distilled and acetylated monoglycerides (abbreviated hereinafter as "Monogly"). Lecithins are a well known and widely available group of substances, which are for example described in "Emulsifiers: The Interfacial Key to Emulsion Stability" by Judie D. Dziezak in Food Tech., October 1988, which is incorporated herein by reference. One or more specific lecithins may be utilized in the present invention. Use of soy lecithin is preferred, because of its relatively low cost. An example of such distilled and acetylated monoglycerides is the commercial product "Myvacet 9-45" from the Eastman Chemical Division, a Division of Eastman Kodak Co., Kingsport, Tenn.;

(2) at least one plasticizer which may, for example, be at least one member selected from the group consisting of polyethylene glycol, glycerol, propylene glycol, carnauba wax, candellila wax, stearic acid, oleic acid, sorbitol, soybean oil, beeswax, and mannitol.

(3) at least one resin or rosin which may, for example, be at least one member selected from the group consisting of shellac, wood rosin, and coumarone indene resin.

(4) at least one protein, which may, for example, be at least one member selected from the group consisting of soy protein, whey, casein, gelatin, and zein.

(5) at least one firming and/or sequestering agent, which may, for example, be at least one member selected from the group consisting of calcium chloride, calcium gluconate, calcium lactate, citric acid and its salt, and ethylenediamine tetraacetic acid and its salt.

(6) at least one antioxidant composition, such as at least one member selected from the group consisting of butylated hydroxyanisole (BHA), butylated hydroxytoluene (BHT), tertiary-butylated hydroquinone (TBHQ), propyl gallate, ascorbic acid, ascorbyl palmitate, tocopherols, and spice extracts (e.g. rosemary or sage extracts) which have antioxidant properties. Inclusion of at least one antioxidant is especially useful for compositions of the present invention to be applied to fruits, vegetables or fungi which undergo browning during storage e.g. bananas, carambolas, pineapples, lychees, cherries, mushrooms or root crops or cut apples, pears, and potatoes.

(7) at least one composition which is a plant growth regulator, such as at least one composition selected from the group consisting of gibberellins, auxins, cytokinins, polyamines, ethephon and jasmonate. Use of a plant growth regulator is particularly desirable for climacteric fruit such as guava, mango, papaya, banana, tomato, avocado, atemoya, peach, pear, plum, apple, melon, passion fruit, persimmon, apricot, nectarine or carambola.

(8) at least one composition which is a chilling injury protectant, including for example at least one composition selected from the group consisting of squalene and proline. In regard to utilization of squalene for chilling injury protection of citrus fruit, see U.S. Pat. No. 4,921,715 (issued May 1, 1990) to Harold E. Nordby et al, which is incorporated herein by reference.

The compositions of the present invention may, for example, be in the following forms: (1) a dry or essentially dry form (e.g. a mixture of ingredients which is powdered, pelleted, formed into tablets, etc.); (2) a form in which some of the ingredients (e.g. the at least one polysaccharide polymer, preservative, acidulant and emulsifier) are dry or essentially dry, while the remainder of the ingredient(s) is/are in liquid form. For example, in this form, the composition could include a powder/pellet(s)/tablet(s) packaged together with a packet of the liquid ingredients; (3) a concentrated liquid form i.e. the ingredients mixed with a small amount of solvent; or (4) a ready to use liquid i.e. with the ingredients mixed with solvent at a concentration appropriate for the intended use. The aforementioned first three forms are intended to be mixed with solvent (e.g. water and/or other solvent) by the user in order to make a solution of a concentration appropriate for the intended use, with subsequent application to the fruit, vegetable or fungi. The advantage of the first three forms over the fourth form is ease of transportation and handling, because of the smaller size and lighter weight of these forms. The advantage of the fourth form is convenience for the user. Examples of typical compositions of the first two forms are delineated in Table 1:

TABLE 1

| Ingredient | Exemplary Range of Proportions of Ingredients, in Weight % About |
|---|---|
| polysaccharide polymer | 0.6 to 65 |
| preservative | 0.6 to 20 |
| acidulant | 0.6 to 20 |
| emulsifiers | 1.2 to 60 |

Table 2 sets forth exemplary ranges of ingredients for the compositions of the present invention of the fourth form i.e. the ingredients are mixed with water and/or dilute ethyl or isopropyl alcohol:

TABLE 2

| Ingredient | Exemplary Range in weight %, about | Preferred Range in weight %, about | Most Preferred Range in weight %, about |
|---|---|---|---|
| polysaccharide polymer | 0.10 to 10.0 | 0.10 to 5.0 | 0.10 to 4.0 |
| preservative | 0.01 to 3.0 | 0.01 to 2.0 | 0.01 to 1.0 |
| acidulant | 0.01 to 5.0 | 0.01 to 4.0 | 0.01 to 3.0 |
| emulsifiers (total) | 0.05 to 9.0 | 0.10 to 7.0 | 0.10 to 2.0 |
| antioxidant (total) | 0.01 to 3.0 | 0.01 to 2.0 | 0.01 to 1.5 |
| plasticizer | 0.10 to 9.0 | 0.10 to 7.0 | 0.10 to 2.0 |
| resin or rosin | 1.0 to 18.0 | 1.0 to 13.0 | 9.0 to 13.0 |
| protein | 0.10 to 10.0 | 0.10 to 5.0 | 1.0 to 3.0 |
| firming or sequestering agent | 0.05 to 5.0 | 0.05 to 2.0 | 0.05 to 0.5 |
| plant growth regulator | 0.00001 to 0.03 | 0.001 to 0.02 | 0.001 to 0.01 |

In practicing the present invention, the aforementioned compositions are applied to an exterior surface of a fruit, vegetable or fungus so as to form a protective edible coating. The exterior surface may for example be a rind or peel or skin, or in the case of peeled or skinned or cut or sliced fruits, vegetables or fungi the exterior surface may be exposed tissue or flesh. For example, the present invention may be employed to treat fruit peeled in accordance with the process described in U.S. Pat. No. 4,284,651 issued Aug. 18, 1981 entitled "Method of Preparing Citrus Fruit Sections with Fresh Fruit Flavor and Appearance" by Joseph H. Bruemmer, which is incorporated herein by reference. In practicing the present invention with peeled or skinned fruits/vegetables/fungi it should be considered that compositions of the instant invention may not adhere well to peeled or skinned fruits/vegetables/fungi having excessive surface moisture. Consequently, for some extremely wet fruits/vegetables/fungi it may be necessary to dry the surface thereof prior to applying the compositions of the present invention.

The specific method of application is not critical to the present invention, and may include any of a variety of well known application techniques such as: dipping or rolling the fruit, vegetable or fungus in the coating composition; applying the composition, as for example, by brushing, rolling, dripping, wiping or rubbing to the fruit, vegetable or fungus with an applicator, e.g. a brush, roller or wipe; spraying the composition onto the fruit, vegetable or fungus e.g. using a sprayer or atomizer. It is preferred to apply the composition to whole fruits at a temperature of from about 30° to about 70° C., more preferably about 50° C. to about 55° C., because the composition is less viscous and such temperatures will reduce microorganism populations on the fruit/vegetable/fungus surface. For partially processed fruits, vegetables or fungi, a temperature range of from about 5° C. to about 20° C. is preferred. The coating may then be permitted to dry, or steps may be taken to expedite drying of the coating, prior to any further handling or processing.

The present invention may be practiced with any of a wide variety of fruits, vegetables or fungi, including for example: tomatoes, tropical fruits such as carambolas, bananas, guavas, papayas, mangoes, avocados, atemoyas; citrus fruits such as grapefruit, orange, lemon, kumquat, lime, tangerine and pommelo; melons, stone fruits such as peach, plum, cherry; berries such as strawberries and blueberries; passion fruit, apple, pear, grapes, pineapple, persimmon, kiwi, root crops, peppers, squash, beans, cucumber, mushrooms and partially processed apples, carrots, celery, and potatoes.

The preferred method of making the compositions of the present invention includes combining the ingredients in a specific order, which is novel, unobvious and highly advantageous. The preferred method comprises: (1) a first step which includes mixing the acidulant and the preservative with water to form a first solution. These two ingredients are solubilized in water in a first step because making the water slightly acidic causes the polysaccharide to dissolve more quickly; (2) a second step (subsequent to the first step) which includes mixing the at least one polysaccharide polymer with the first solution in order to produce a second solution. This second step is carried out because dissolving the polysaccharide to near completion before the addition of lecithin ensures quicker dissolution and a more uniform final solution; (3) a third step (subsequent to the second step) which includes mixing a first emulsifier (i.e. lecithin) with the second solution to form a first mixture. Lecithin is combined with the other ingredients in this third step because if it is added with the polysaccharide, the polysaccharide tends to adhere to the lecithin which hinders the dissolution of both materials. Optionally, the third step may include heating the lecithin and second solution to at least about 40° C. during the step of mixing. This optional step of heating is advantageous because the heat expedites dissolving of the lecithin; (4) a fourth step subsequent to the third step optionally includes mixing the first mixture with the second emulsifier and homogenizing the entire mixture to homogeneity. The aforementioned process is advantageous because the second emulsifier is easily incorporated into a mixture in which lecithin and polysaccharide are already mixed, and the subsequent homogenization ensures a uniform final mixture. Optionally, the method of making the compositions of the present invention may also include: dissolving the growth regulator or certain antioxidants in an organic solvent (e.g. ethanol) to form a third solution. This is advantageous because these compounds are more soluble in ethanol than in water; and combining the third solution with the first mixture during the fourth step. Furthermore, if using propylene glycol as a plasticizer in a composition including a cellulose, any antioxidant which is not soluble in water can be pre-dissolved in the propylene glycol before adding this to the first mixture. These optional steps are advantageous because they facilitate dissolving these compounds in the mixture.

While not wishing to be bound by any theory, Applicants believe that keeping fruits, vegetables or fungi healthy and fresh may depend, at least in part, on the permeability of the coating to water vapor and gases, such as oxygen and carbon dioxide, as well as the combined effect of the various ingredients. It is believed that the coatings of the present invention may act as a partial barrier to water vapor, oxygen, carbon dioxide and possibly flavor volatiles, thereby causing an alteration in metabolic processes within the fruit, vegetable or fungus tissue and reducing weight loss. For example, by providing a partial barrier to oxygen, the coating retards oxygen uptake by the fruit, vegetable or fungus. Production of ethylene, a natural growth regulator which promotes general ripening of climacteric fruits and vegetables, and color development of some non-climacteric fruits and vegetables, is thus diminished because such oxygen uptake is required for ethylene production. Also, providing a partial barrier to water vapor slows weight loss which would occur with loss of water vapor. Retention of flavor volatiles may be due to the coating's semipermeable properties which may provide a barrier to flavor volatile loss from the fruit, vegetable or fungus. Alternatively, or additively, the ability of the film to alter metabolism due to reduced oxygen uptake by the fruit, vegetable or fungus, may result in increased flavor volatile synthesis.

The following examples are intended only to further illustrate the invention and are not intended to limit the scope of the invention as defined by the claims.

EXAMPLE 1

Two hundred milliliters of deionized water was placed in a beaker and continuously stirred with a magnetic stirrer as each of the following ingredients were added. Initially, the water was heated to 70° C. and 10 grams of CMC (from DOW Chemical) was dissolved therein. This solution was kept at 70° C. and stirring was continued until the solution was clear. An additional two hundred milliliters of deionized water was then added and the heat source was turned off. Once this solution was clear: 0.75 grams of sodium benzoate dissolved in a small amount of water; 0.05 grams citric acid dissolved in a small amount of water; and 0.1 grams of BHA dissolved in a small amount of ethyl alcohol; were added as stirring continued. Next, 10 grams of TWEEN80 TM, 5 grams of lecithin and sufficient deionized water to bring the total to 500 milliliters were added and stirring was continued until the mixture was uniform. This yielded a composition including: 2% CMC, 1.0% lecithin, 0.15% sodium benzoate, 0.01% citric acid, 0.02% BHA and 2.0% TWEEN80 TM. This composition is hereafter referred to as "G1". A second composition was made in accordance with the foregoing procedure but with the addition of 20 ppm gibberellic acid. This second composition is hereafter referred to as "G1wGA". A first group of fairly green bananas was coated with composition G1, another group of similar bananas was coated with composition G1wGA, and a third group of similar bananas were kept untreated as a control. All three groups of bananas were stored at about 21° C.

Results are described in the following Table 4 and shown in FIG. 1:

TABLE 4

| Length of Time After Coating | Bananas Coated with G1 | Bananas Coated with G1wGA | Control (no coating) |
| --- | --- | --- | --- |
| 5 days | Yellow with a little green mostly at stem. Beginning to soften. Very few brown spots. Medium ripeness | Yellow and Green some brown spots. Beginning to soften. Least ripe | Mostly yellow, softening, still greenish at stem, Some brown spots. Some discoloration (grayish areas on some). Ripest |
| 7 days | Ripe. Yellow with a few green areas. Many brown parts. Soft. | Yellow with one third green areas. Rusty colored spots. Fairly soft. | Overripe. Greyish discoloration. some green at stems. Full of brown spots. Soft. |

FIG. 1 shows four bunches of bananas, the two bunches on the right are those coated with G1wGA, and the two bunches on the left are the control (i.e. no coating). As can be seen in FIG. 1, after 5 days of storage, the uncoated bananas have many unsightly brown spots and grayish discoloration. While by stark contrast the bananas coated with G1wGA are an appealing uniform yellow, and surprisingly even still have some green near the stems. The coated bananas are only beginning to soften, and have not ripened to the extent of the uncoated bananas. This example shows that deterioration of the bananas, was slowed by use of coating G1 (as compared to the control) and was slowed to a greater extent by coating G1wGA.

EXAMPLE 2

For each of three compositions, 200 milliliters of deionized water was placed in a beaker and continuously stirred with a magnetic stirrer as each of the following ingredients were added. Initially 5 grams of CMC was added to the water. Next 7.5 grams of lecithin was added and this mixture was heated to 60° C. and held for 30 minutes. Then 2.5 grams of TWEEN80 ™ was added. Then: 0.75 grams of predissolved sodium benzoate dissolved in a small amount of water, 0.25 grams of BHT dissolved in a small amount of ethyl alcohol, 0.25 grams of BHA dissolved in a small amount of ethyl alcohol, and 0.05 grams of citric acid dissolved in a small amount of water; were added. For a first of the compositions, enough gibberellic acid (predissolved in ethyl alcohol) was added to yield 10 ppm in the final composition (this is referred to hereafter as composition B). For a second of the compositions enough gibberellic acid (predissolved in ethyl alcohol) was added to yield 20 ppm in the final composition (referred to hereafter as composition C). No gibberellic acid was added to the third composition (hereafter referred to as A). Enough deionized water was added to each of the three compositions to yield a total of 500 milliliters. Each of the three solutions was then heated to 60° C. and blended for 15 minutes in a Waring Blender to form a homogenous mixture. Three other compositions were made in a manner identical to A, B and C, except that 1.5% CMC was used instead of 1% CMC. These compositions are referred to hereinafter as D, E and F respectively. The proportions of ingredients in these six compositions is set forth in Table 5:

TABLE 5

(except as noted entries are in weight)

| | COMPOSITION NAME | | | | | |
|---|---|---|---|---|---|---|
| | A | B | c | D | E | F |
| CMC | 1.0 | 1.0 | 1.0 | 1.5 | 1.5 | 1.5 |
| lecithin | 1.5 | 1.5 | 1.5 | 1.5 | 1.5 | 1.5 |
| TWEEN80 ™ | 0.5 | 0.5 | 0.5 | 0.5 | 0.5 | 0.5 |
| Sodium benzoate | 0.15 | 0.15 | 0.15 | 0.15 | 0.15 | 0.15 |
| BHT | 0.05 | 0.05 | 0.05 | 0.05 | 0.05 | 0.05 |
| BHA | 0.05 | 0.05 | 0.05 | 0.05 | 0.05 | 0.05 |
| Citric Acid | 0.01 | 0.01 | 0.01 | 0.01 | 0.01 | 0.01 |
| Gibberellic Acid | none | 10 pp | 20 ppm | none | 10 pp | 20 ppm |

Each of these compositions was heated to 55° C. and brushed onto tomatoes. The tomatoes were then stored at 21° C. The application of these films retarded the ripening of the tomatoes. The addition of the growth regulator gibberellic acid further retarded the ripening.

EXAMPLE 3

For each of two compositions, the procedure for making the compositions followed that of example 2 except that BHA and BHT were not used and the use of sodium bisulfite instead of sodium benzoate. The two compositions varied in their level of CMC (referred to hereafter as Film A and Film B). The proportions of ingredients in these two compositions is set forth in Table 6.

TABLE 6

| Ingredient | COMPOSITION NAME | |
|---|---|---|
| (weight %) | Film A | Film B |
| CMC | 1.0 | 2.0 |
| lecithin | 1.0 | 1.0 |
| TWEEN80 ™ | 2.0 | 2.0 |
| Sodium bisulfite | 0.2 | 0.2 |

TABLE 6-continued

| Ingredient | COMPOSITION NAME | |
|---|---|---|
| (weight %) | Film A | Film B |
| Citric acid | 0.01 | 0.01 |
| Gibberellic acid | 0.005 | 0.005 |

Figure 2:
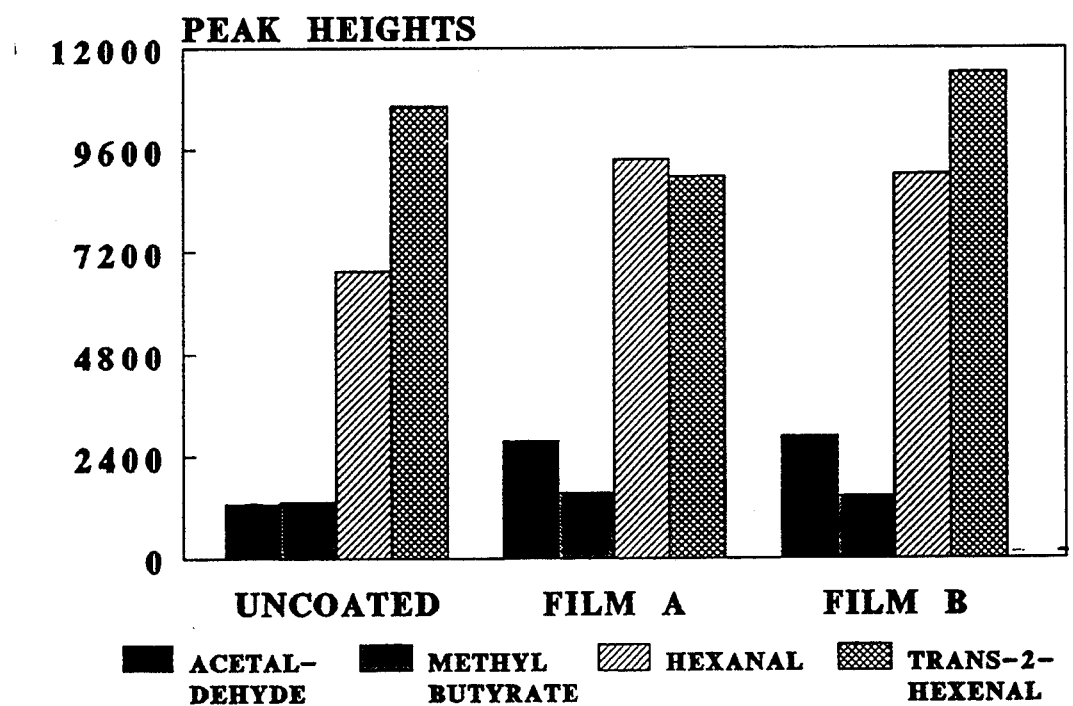
FIG. 2 is a bar graph of peak heights of flavor components from lemons (after 11 days storage at 70° F. (21° C.)), which were coated with either film A or B or left uncoated, as described in Example 3.

Each of these compositions were brushed onto lemons at 55° C. and the lemons were stored at 21° C. A third batch of lemons were left uncoated at the same storage temperature. The coated and uncoated lemons were analyzed for their important volatile components. Results in FIG. 2 showed that the coated lemons had relatively higher values in some of the important volatile flavor components.

EXAMPLE 4

For each of three compositions, 200 milliliters of deionized water was placed in a beaker and continuously stirred with a magnetic stirrer as each of the following ingredients were added. Initially, 0.05 grams of citric acid and 0.75 grams of benzoic acid was added to the water. Next, 7.5 grams of CMC was added to the slightly acidic water. This slight reduction in the pH of the water dissolved the CMC faster. Then 2.5 grams lecithin was added and this mixture was heated to 60° C. and held for 30 minutes. Then 1.0 milliliter of polyethylene glycol was added. For the first of the compositions, 0.25 grams of BHA and 0.25 grams of BHT (predissolved in small amount of ethyl alcohol) was added to yield 0.05% BHA and 0.05% BHT in the final composition (this is referred to hereafter as composition A). For a second of the compositions, 0.25 grams of ascorbic acid (predissolved in small amount of water) was added to yield 0.05% ascorbic acid in the final composition (referred to hereafter as composition B). For the third of the compositions, 0.25 grams of rosemary extract was added to yield 0.05% rosemary in the final composition (referred to hereafter as composition C). Enough deionized water was added to each of the three compositions to yield a total volume of 500 milliliters. Each of the three mixtures was then heated to 60° C. and homogenized for 15 minutes using a Polytron. The proportions of ingredients in these three compositions is set forth in Table 7:

TABLE 7

| Ingredient | COMPOSITION NAME | | |
|---|---|---|---|
| (weight %) | Film A | Film B | Film C |
| CMC | 1.5 | 1.5 | 1.5 |
| lecithin | 0.5 | 0.5 | 0.5 |
| PEG | 0.2 | 0.2 | 0.2 |
| benzoic acid | 0.15 | 0.15 | 0.15 |
| citric acid | 0.01 | 0.01 | 0.01 |
| BHA | 0.05 | — | — |
| BHT | 0.05 | — | — |
| ascorbic acid | — | 0.05 | — |
| rosemary extract | — | — | 0.05 |

Figure 3:
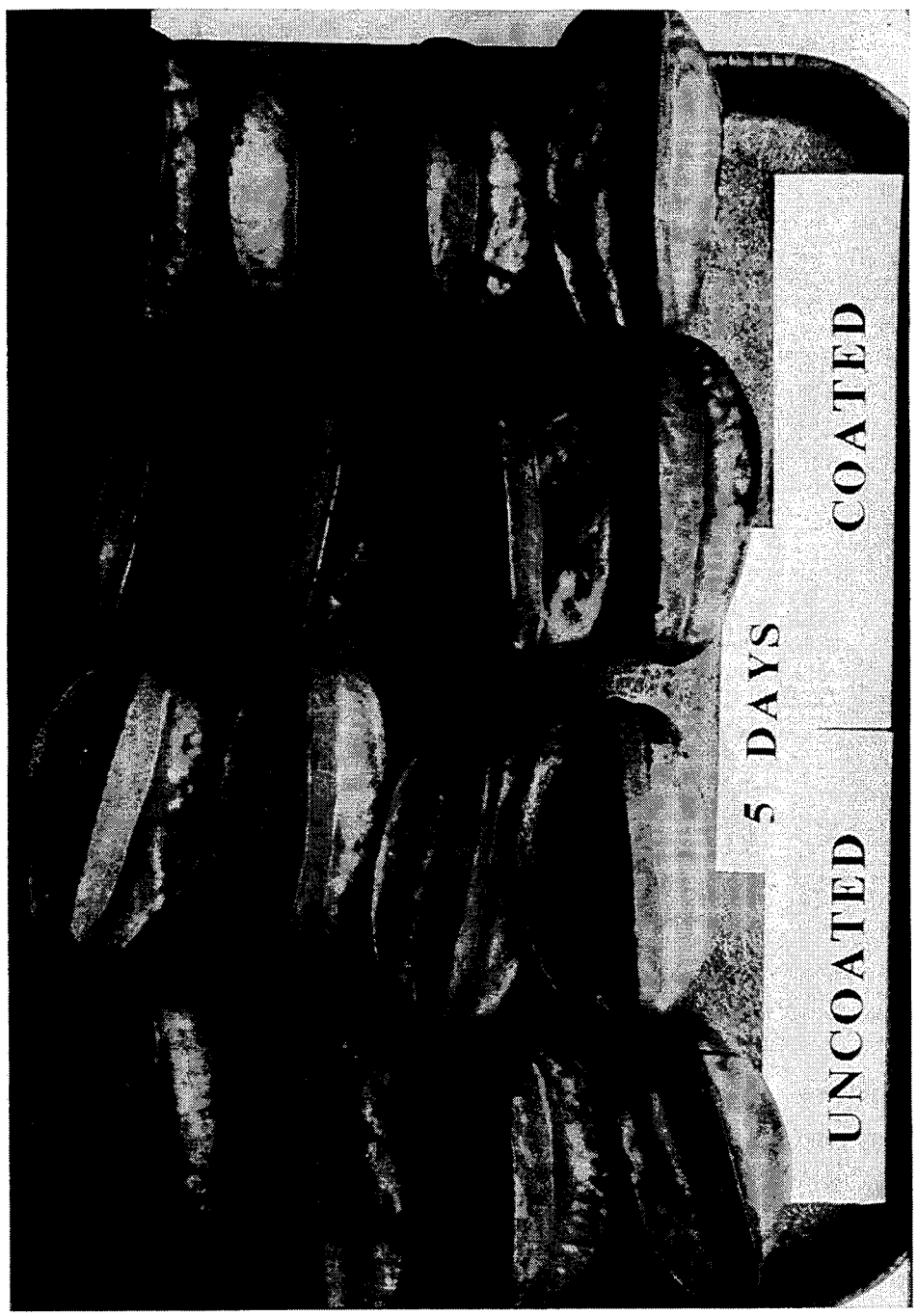
FIG. 3 is a photograph of coated and uncoated carambolas, described in Example 4.

Each of these compositions were brushed onto carambolas at 55° C. and the carambolas were stored at 13° C. The application of these coatings caused considerable reduction in surface discoloration of the carambolas. FIG. 3 shows two groups of carambolas. The group on the right is the carambolas coated with film C, while the group on the left is the uncoated (i.e. control) group. As shown in FIG. 3, after 5 days of storage, the uncoated carambolas are discolored and have unsightly brown spots. By contrast the coated carambolas still have their appealing green color. After 9 days of storage, film C (i.e. with the rosemary extract) was the most effective, followed by ascorbic acid (film B) and lastly by BHA/BHT combination (film A).

EXAMPLE 5

Figure 4:
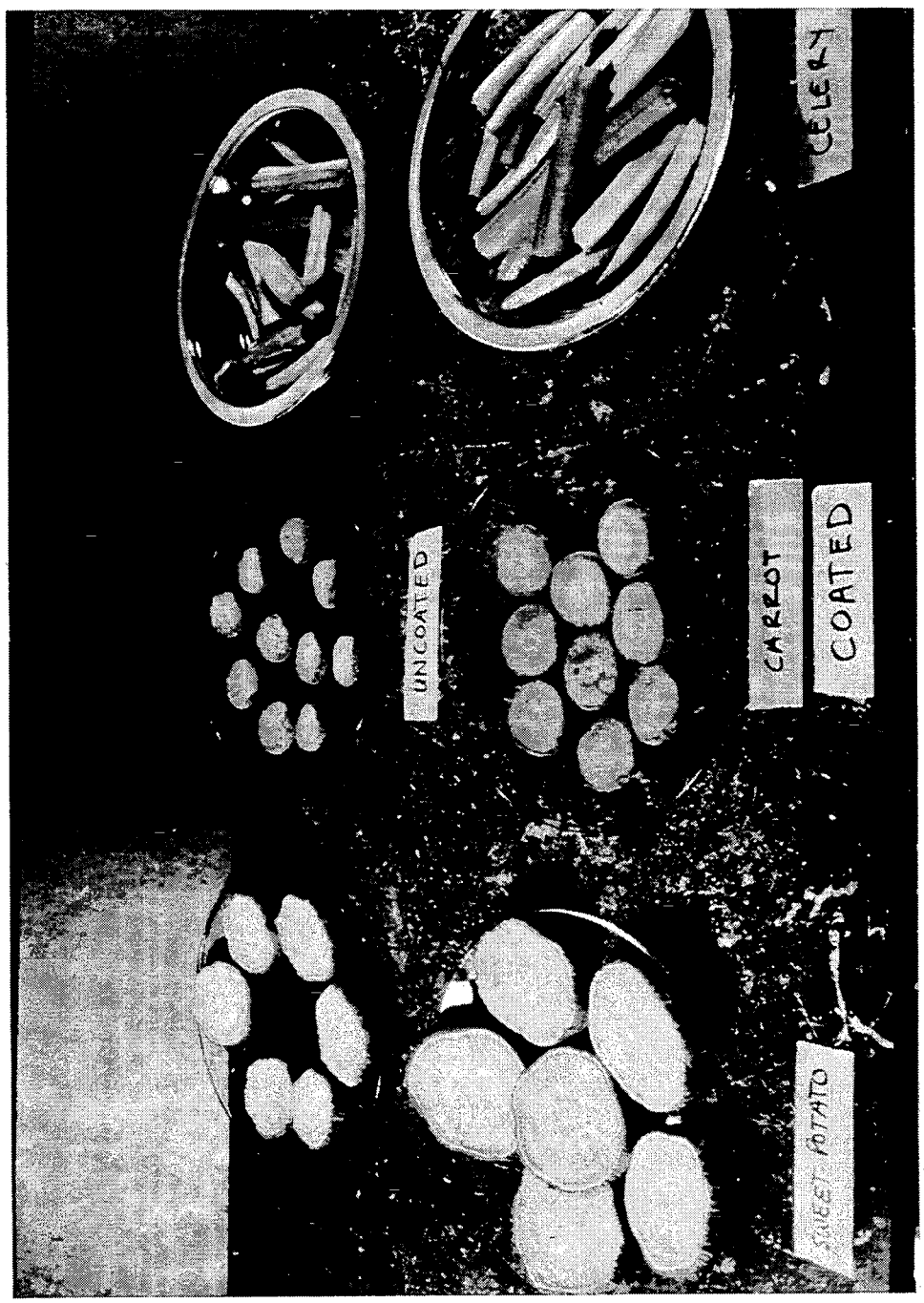
FIG. 4 is a photograph of coated and uncoated cut and sliced carrots, celery and sweet potatoes, as referred to in Example 5.

Composition B from example 4 was brushed on cut and sliced carrots, celery and sweet potatoes at 35°–40° and stored at room temperature (21° C.) for 24 hours for observation and comparison to a second (control) batch of cut and sliced carrots, celery and sweet potatoes that were left uncoated. As shown in FIG. 4, the coated carrots, celery and sweet potatoes exhibited less degree of surface discoloration and desiccation (shrinkage).

EXAMPLE 6

The purpose of this example is to show the superiority of the coatings of the present invention in comparison with a commercially available coating i.e. SEMPERFRESH ™ (from Fermenta Plant Protection Co., Mentor, Ohio). For each of two compositions, the procedure for making each composition followed that of example 3 except for the addition of the antioxidants. These two compositions varied in the level of CMC added (referred to hereafter as coatings A and B). For a third coating, 7.5 grams of SEMPERFRESH ™ was added to 200 milliliters of deionized water in a beaker and continuously stirred using a magnetic stirrer until the solid particles were fully dissolved, then deionized water was added to bring the total up to 500 milliliters (referred to hereafter as coating C). The proportions of ingredients in these three coatings is set forth in Table 8.

TABLE 8

| Ingredient | COATING NAME | | |
|---|---|---|---|
| (weight %) | A | B | C |
| CMC | 1.5 | 1.0 | — |
| lecithin | 0.5 | 0.5 | — |
| PEG | 0.2 | 0.2 | — |
| benzoic acid | 0.15 | 0.15 | — |
| citric acid | 0.01 | 0.01 | — |
| SEMPERFRESH ™ | — | — | 1.5 |

Each of these coatings were brushed onto papayas and mangoes at 55° C. and the fruits were stored at 21° C. Results are described in Table 9, and FIG. 5.

TABLE 9

| Length of Time After Coating | Control (no coating) | A | B | C |
|---|---|---|---|---|
| | % Ripe Papaya | | | |
| 5 Days | 100 | 0 | 50 | 75 |
| 7 Days | Overripe | 50 | 100 | 100 |
| | % Ripe Mango | | | |

TABLE 9-continued

| Length of Time After Coating | Control (no coating) | A | B | C |
|---|---|---|---|---|
| 7 Days | 100 | 25 | 50 | 60 |
| 9 Days | Overripe | 85 | 80 | 100 |
| 12 Days | Overripe | 100 | 100 | Overripe |

Figure 5:
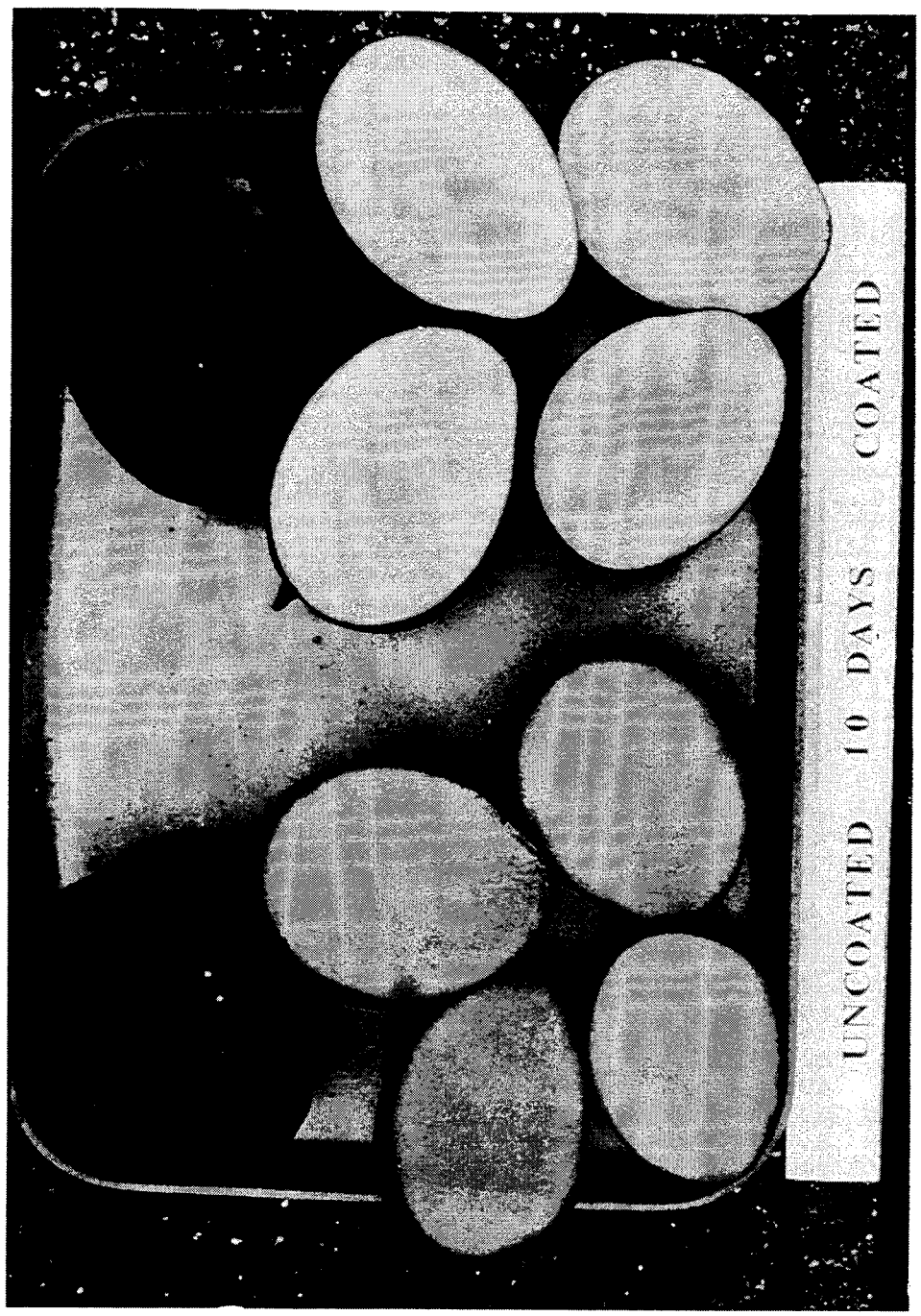
FIG. 5 is a photograph of coated and uncoated mangoes as described in Example 6.

FIG. 5 shows two groups of sliced and whole mangoes. The group on the right was coated with coating A. The group on the left was uncoated (i.e. the control). As can be seen in FIG. 5, after 10 days of storage, the sliced uncoated mangoes are darkened and discolored, and the uncoated whole mango is blotchy and discolored. By contrast, both the sliced and whole coated mangoes are not blotchy or discolored or darkened.

EXAMPLE 7

Five grams each carboxymethylcellulose (CMC) or hydroxypropyl cellulose (HPC) were placed in separate beakers. In other beakers, 2.5 grams each of CMC and HPC were combined. The powders were dispersed in a vortex of 30 milliliters of hot deionized water (70° to 95° F.) for about 15-20 minutes in order to hydrate the cellulose. Fifty milliliters of ice-cold deionized water was added to the mixture to form a solution. Upon dissolution of the cellulose powders, 0.1 gram citric acid in deionized water, 0.15 grams potassium sorbate (K sorbate) in deionized water, and 0.02% BHA in isopropyl alcohol were added. Next, optionally 1.0 gram of oleic acid, distilled and acetylated monoglycerides, glycerol, steric acid, lecithin, sorbitol, and polyethylene 8000 were added to the various beakers of the cellulose solutions. All volumes were brought to a total of 100 milliliters with deionized water. The 21 different compositions were prepared and are listed in Table 10. Each of the coating formulations were brushed onto limes. After drying at room temperature, the limes were placed in plastic bags and stored at 5° C. for two days. Tackiness was determined by removing the limes from the plastic bags and exposing them at 70° F. and 95% relative humidity.

All coating compositions which contain CMC flaked off the fruit with the exception of the compositions containing CMC and the plasticizer oleic acid. All coating compositions with HPC did not flake off the fruit even after extended exposure to room temperature. HPC seems to have inherent plasticizing properties which are lacking with MC and CMC. Therefore, it is not necessary to use emulsifiers or plasticizers in coating compositions that include HPC. HPC compositions were the least tacky and remain shiny. Furthermore, when composition VIII and XV were used to coat bananas, there was better control of ripening.

TABLE 10

| TREATMENT | POLYSACCHARIDE | EMULSIFIER | PLASTICIZER | ACIDULANT | PRESERVATIVE | ANTIOXIDANT |
|---|---|---|---|---|---|---|
| I | 5% CMC | | | 0.1% citric acid | 0.15% K Sorbate | 0.02% BHA |
| II | 5% CMC | | 1% Oleic acid | 0.1% citric acid | 0.15% K Sorbate | 0.02% BHA |
| III | 5% CMC | 1% distilled and acetylated monogly | | 0.1% citric acid | 0.15% K Sorbate | 0.02% BHA |
| IV | 5% CMC | | 1% glycerol | 0.1% citric acid | 0.15% K Sorbate | 0.02% BHA |
| V | 5% CMC | | 1% sorbitol | 0.1% citric acid | 0.15% K Sorbate | 0.02% BHA |
| VI | 5% CMC | | 1% Stearic acid | 0.1% citric acid | 0.15% K Sorbate | 0.02% BHA |
| VII | 5% CMC | | 1% PEG 8000 | 0.1% citric acid | 0.15% K Sorbate | 0.02% BHA |
| VIII | 5% HPC | | | 0.1% citric acid | 0.15% K Sorbate | 0.02% BHA |
| IX | 5% HPC | | 1% Oleic acid | 0.1% citric acid | 0.15% K Sorbate | 0.02% BHA |
| X | 5% HPC | 1% distilled and acetylated | | 0.1% citric acid | 0.15% K Sorbate | 0.02% BHA |

TABLE 10-continued

| TREATMENT | POLYSACCHARIDE | EMULSIFIER | PLASTICIZER | ACIDULANT | PRESERVATIVE | ANTIOXIDANT |
|---|---|---|---|---|---|---|
| XI | 5% HPC | monogly | 1% glycerol | 0.1% citric acid | 0.15% K Sorbate | 0.02% BHA |
| XII | 5% HPC | | 1% sorbitol | 0.1% citric acid | 0.15% K Sorbate | 0.02% BHA |
| XIII | 5% HPC | | 1% Stearic acid | 0.1% citric acid | 0.15% K Sorbate | 0.02% BHA |
| XIV | 5% HPC | | 1% PEG 8000 | 0.1% citric acid | 0.15% K Sorbate | 0.02% BHA |
| XV | 5% HPC and CMC | | | 0.1% citric acid | 0.15% K Sorbate | 0.02% BHA |
| XVI | 5% HPC and CMC | | 1% Oleic acid | 0.1% citric acid | 0.15% K Sorbate | 0.02% BHA |
| XVII | 5% HPC and CMC | 1% distilled and acetylated monogly | | 0.1% citric acid | 0.15% K Sorbate | 0.02% BHA |
| XVIII | 5% HPC and CMC | | 1% glycerol | 0.1% citric acid | 0.15% K Sorbate | 0.02% BHA |
| XIX | 5% HPC and CMC | | 1% sorbitol | 0.1% citric acid | 0.15% K Sorbate | 0.02% BHA |
| XX | 5% HPC and CMC | | 1% Stearic acid | 0.1% citric acid | 0.15% K Sorbate | 0.02% BHA |
| XXI | 5% HPC and CMC | | 1% PEG 8000 | 0.1% citric acid | 0.15% K Sorbate | 0.02% BHA |

EXAMPLE 8

TABLE 11

| TREATMENT | POLYSACCHARIDE | EMULSIFIER | PLASTICIZER | ACIDULANT | PRESERVATIVE | ANTIOXIDANT | ROSIN OR RESIN | % WEIGHT LOSS |
|---|---|---|---|---|---|---|---|---|
| I | 5% HPC | 0.2% lecithin | 2% propylene glycol | 0.1% citric acid | 0.15% K sorbate | 0.05% BHA | — | 1.21 |
| II | 5% HPC | 0.2% lecithin | 2% propylene glycol | 0.1% citric acid | 0.15% K sorbate | 0.05% BHA | 9% shellac | 1.32 |
| III | 5% MC | 0.2% lecithin | 2% propylene glycol | 0.1% citric acid | 0.15% K sorbate | 0.05% BHA | — | 1.24 |
| IV | 5% MC | 0.2% lecithin | 2% propylene glycol | 0.1% citric acid | 0.15% K sorbate | 0.05% BHA | 9% shellac | 1.37 |
| V | 5% CMC | 0.2% lecithin | 2% propylene glycol | 0.1% citric acid | 0.15% K sorbate | 0.05% BHA | — | 1.36 |
| VI | 5% CMC | 0.2% lecithin | 2% propylene glycol | 0.1% citric acid | 0.15% K sorbate | 0.05% BHA | 9% shellac | 1.29 |
| VII | Commercial Coating* | | | | | | | .96 |
| VIII | Control** | | | | | | | 1.51 |

*Commercial Coating is FMC 360 HS Wax
**No Coating

Cellulose coating compositions were prepared as previously described with the addition of a resin in order to access weight loss of fruit. See Table 11 for the different preparations of compositions for this example. It was found that the addition of shellac did not cause any improvement in weight loss after seven days. The coatings showed a higher rate of weight loss when compared to the commercial coating which consists mainly of shellac resin. Although the addition of shellac to cellulosic coatings does not improve weight loss, the permeability of the coatings to $CO_2$ and $O_2$ is reduced which offers the advantage of delayed ripening and senescence which would be useful for quarantine purposes.

EXAMPLE 9

Cellulose coating compositions were prepared as previously described with the addition of a protein and/or a sequestering or firming agent. See Table 12 for the different preparations of compositions for this example. Apple and mushroom slices were dipped into the coating formulations for 3–5 seconds and placed on glass plates to air dry. After 30 minutes they were covered with plastic wrap and stored in a refrigerator for 48 hours. The mushroom slices dipped in coating IV and apple slices dipped in coating VIII showed the least discoloration.

TABLE 12

| TREATMENT | POLYSACCHARIDE | EMULSIFIER | FIRMING OR SEQUESTERING AGENT | PLASTICIZER | ACIDULANT | ANTIOXIDANT | PROTEIN |
|---|---|---|---|---|---|---|---|
| I | 0.2% CMC | — | — | 0.2% Propylene Glycol | 0.05% citric acid | 0.02% BHA | — |
| II | 0.2% CMC | — | 0.2% CaCl$_2$ | 0.2% Propylene Glycol | 0.05% citric acid | 0.02% BHA | — |
| III | 0.2% CMC | — | 0.2% CaCl$_2$ | 0.2% Propylene Glycol | 0.05% citric acid | 0.02% BHA + 1% ascorbic acid | — |
| IV | 0.2% CMC | — | 0.2% Calcium disodium EDTA | 0.2% Propylene Glycol | 0.05% citric acid | 0.02% BHA | — |
| V | 0.2% CMC | — | 0.2% Calcium disodium EDTA | 0.2% Propylene Glycol | 0.05% citric acid | 0.02% BHA + 1% ascorbic acid | — |
| VI | 0.2% CMC | — | — | 0.2% Propylene Glycol | 0.05% citric acid | 0.02% BHA | 1% soy protein |
| VII | 0.2% CMC | — | 0.2% CaCl$_2$ | 0.2% Propylene Glycol | 0.05% citric acid | 0.02% BHA | 1% soy protein |
| VIII | 0.2% CMC | — | 0.2% CaCl$_2$ | 0.2% Propylene | 0.05% citric | 0.02% BHA + | 1% soy |

TABLE 12-continued

| TREATMENT | POLYSAC-CHARIDE | EMULSIFIER | FIRMING OR SEQUESTERING AGENT | PLASTI-CIZER | ACIDULANT | ANTI-OXIDANT | PROTEIN |
|---|---|---|---|---|---|---|---|
| | | | | Glycol | acid | 1% ascorbic acid | protein |
| IX | 0.2% CMC | — | 0.2% Calcium disodium EDTA | 0.2% Propylene Glycol | 0.05% citric acid | 0.02% BHA | 1% soy protein |
| X | 0.2% CMC | — | 0.2% Calcium disodium EDTA | 0.2% Propylene Glycol | 0.05% citric acid | 0.02% BHA + 1% ascorbic acid | 1% soy protein |
| Control - treated with deionized water | | | | | | | |

EXAMPLE 10

Cellulose coating compositions were prepared as previously described. Lipid plasticizers were added in order to reduce moisture or weight loss. The coatings where brushed onto apples. After air drying, the apples were stored at 70° F. and 95% relative humidity. The addition of 2% carnauba wax gave results comparable to a commercial coating which is approximately 8% carnauba wax. As can be seen from Table 13 (see following page), less lipid plasticizer is required in the compositions of the instant invention as compared to the commercial coating.

TABLE 13

| TREAT-MENT | POLY-SACCHARIDE | EMULSIFIER | PLASTICIZER | ACIDULANT | PRESERVATIVE | ANTI-OXIDANT | WEIGHT LOSS |
|---|---|---|---|---|---|---|---|
| I | 3% HPC | .2% lecithin | 0.2% sorbitol | 0.1% citric acid | 0.15% K sorbate | 0.02% BHA | 0.3 |
| II | 3% HPC | .2% lecithin | 1.0% carnauba wax + 0.2% Sorbitol | 0.1% citric acid | 0.15% K sorbate | 0.02% BHA | 0.3 |
| III | 3% HPC | .2% lecithin | 2.0% carnauba wax + 0.2% Sorbitol | 0.1% citric acid | 0.15% K sorbate | 0.02% BHA | 0.2 |
| IV | 3% HPC | .2% lecithin | 1.0% oleic acid + 0.2% Sorbitol | 0.1% citric acid | 0.15% K sorbate | 0.02% BHA | 0.3 |
| Control = No Coating | | | | | | | 0.8 |
| Commercial = 8% Carnauba Wax | | | | | | | 0.2 |

The foregoing detailed descriptions and examples are given merely for purposes of illustration. Modifications and variations may be made therein without departing from the spirit and scope of the invention.

We claim:

1. An edible composition for use in coating a fruit, vegetable or fungus, comprising
   from about 0.1 weight percent to about 4.0 weight percent of at least one polysaccharide polymer;
   from about 0.01 weight percent to about 1.0 weight percent of at least one preservative;
   from about 0.01 weight percent to about 3.0 weight percent of at least one acidulant;
   up to about 99.88 weight percent of water; said amounts being selected in amounts effective to provide a semipermeable coating that will improve the shelf life of the fruit, vegetable, or fungus.

2. The composition of claim 1 further including
   from about 0.01 weight percent to about 1.5 weight percent of at least one antioxidant; and
   from about 0.50 weight percent to about 10 weight percent of alcohol.

3. The composition of claim 2 wherein said antioxidant is at least one member selected from the group consisting of butylated hydroxyanisole, butylated hydroxytoluene, tertiary-butylated hydroquinone, propyl gallate, ascorbic acid, ascorbyl palmitate, tocopherols, and spice extracts which have antioxidant properties.

4. The composition of claim 1 wherein said at least one polysaccharide polymer is at least one polysaccharide polymer selected from the group consisting of carboxymethylcellulose, hydroxypropyl cellulose, hydroxypropyl methylcellulose, methylcellulose, guar gum, locust bean gum, pectin, xanthan gum, modified starch and carrageenan.

5. The composition of claim 4 wherein said polysaccharide polymer is hydroxypropyl cellulose.

6. The composition of claim 1 wherein said preservative is at least one member selected from the group consisting of sodium propionate, calcium propionate, benzoic acid, sodium benzoate, potassium sorbate, and sodium bisulfite, or said composition containing at least one microorganism which is an antagonist against plant pathogens or an antimicrobial essential plant oil.

7. The composition of claim 1 wherein said acidulant is at least one member selected from the group consisting of malic acid, citric acid, propionic acid, succinic acid, tartaric acid, fumaric acid, and ascorbic acid.

8. A fruit, vegetable or fungus having on an exterior surface thereof the composition of claim 1.

9. A method for increasing stability of a fruit, vegetable, or fungus comprising applying the composition of claim 1 to an exterior surface of a fruit, vegetable, or fungus so as to form a protective edible coating.

10. The composition of claim 1 further including from about 0.10 weight percent to about 2.0 weight percent of at least one plasticizer.

11. The composition of claim 10 wherein said plasticizer is at least one member selected from the group consisting of polyethylene glycol, glycerol, propylene glycol, carnauba wax, candellila wax, stearic acid, oleic acid, sorbitol, soybean oil, beeswax, and mannitol.

12. The composition of claim 10 wherein said polysaccharide polymer is hydroxypropyl cellulose and said plasticizer is sorbitol.

13. The composition of claim 10 further including from about 0.1 weight percent to about 2.0 weight percent of at least one emulsifier; and from about 9.0 weight percent to about 13.0 weight percent of at least one resin or rosin.

14. The composition of claim 13 wherein said emulsifier is at least one member selected from the group consisting of lecithin, polyoxyethylene sorbitan monooleate, polyoxyethylene sorbitan monostearate, polyoxyethylene sorbitan tristearate, polyoxyethylene sorbitan monolaurate and distilled and acetylated monoglycerides; and, said resin or rosin is at least one member selected from the group consisting of shellac, wood rosin, and coumarone indene resin.

15. A method for increasing stability of a fruit, vegetable, or fungus comprising applying the composition of claim 13 to an exterior surface of a fruit, vegetable, or fungus so as to form a protective edible coating.

16. The composition of claim 10 further including from about 1.0 weight percent to about 3.0 weight percent of at least one protein.

17. The composition of claim 16 wherein said protein is at least one member selected from the group consisting of soy protein, whey, casein, gelatin, and zein.

18. A method for increasing stability of a fruit, vegetable, or fungus comprising applying the composition of claim 16 to an exterior surface of a fruit, vegetable, or fungus so as to form a protective edible coating.

19. The composition of claim 10 further including from about 0.05 weight percent to about 0.5 weight percent of at least one firming or sequestering agent.

20. The composition of claim 19 wherein said firming or sequestering agent is at least one member selected from the group consisting of calcium chloride, calcium gluconate, calcium lactate, citric acid and its salt, and ethylenediamine tetracetic acid and its salt.

21. A method for increasing stability of a fruit, vegetable, or fungus comprising applying the composition of claim 19 to an exterior surface of a fruit, vegetable, or fungus so as to form a protective edible coating.

22. The composition of claim 10 further including from about 0.1 weight percent to about 2.0 weight percent of at least one emulsifier.

23. The composition of claim 22 wherein said plasticizer is at least one member selected from the group consisting of polyethylene glycol, glycerol, propylene glycol, carnauba wax, candellila wax, stearic acid, oleic acid, sorbitol, soybean oil, beeswax, and mannitol.

24. A method for increasing stability of a fruit, vegetable, or fungus comprising applying the composition of claim 22 to an exterior surface of a fruit, vegetable, or fungus so as to form a protective edible coating.

25. A method for increasing stability of a fruit, vegetable, or fungus comprising applying the composition of claim 10 to an exterior surface of a fruit, vegetable, or fungus so as to form a protective edible coating.

* * * * *